Sept. 10, 1940.    E. M. CLAYTOR    2,214,100
OVERDRIVE CONTROL SYSTEM
Filed Sept. 29, 1939    2 Sheets-Sheet 1

INVENTOR
Edward M. Claytor
BY
Spencer Hardman & Fehr
his ATTORNEYS

Patented Sept. 10, 1940

2,214,100

UNITED STATES PATENT OFFICE 2,214,100

OVERDRIVE CONTROL SYSTEM

Edward M. Claytor, Anderson, Ind., assignor to General Motors Corporation, Detroit, Mich., a corporation of Delaware Application September 29, 1939, Serial No. 297,034

4 Claims. (Cl. 74—472)

This invention relates to electrically operated means for controlling the overdrive gearing for an automotive vehicle. One type of overdrive with which the present invention may be used is one in which a shaft transmitting power from the change speed gearing of the automobile may be connected with the propeller shaft for a 1 to 1 gear ratio drive or indirectly through planetary gearing of the overdrive by means of which the propeller shaft is caused to rotate faster than the drive shaft. The planetary gearing includes a sun gear which rotates with the drive shaft when the overdrive is not operative. To render the overdrive operative, the sun gear must be held stationary. In my copending application S. N. 241,917, filed November 23, 1938, I disclose an overdrive control in which the sun gear locking pawl is urged normally into locking position by a spring, and in which the locking pawl is retracted by the operation of a solenoid. In order to facilitate retraction of the sun gear locking pawl by the solenoid I provide a relay which disables the ignition circuit momentarily until the solenoid has completed its operation. The disabling of the ignition circuit causes the engine to cease firing until the sun gear latch or pawl is withdrawn, whereupon the normal firing is reestablished.

The present invention is concerned more particularly with an overdrive controlled by a sun gear locking pawl which is actuated by the solenoid into locking position and by a spring out of locking position. The present invention is concerned with momentarily disabling the ignition circuit during the time in which the sun gear locking pawl is retracted by spring operation. According to the disclosure of my copending application Serial No. 290,356, filed August 16, 1939, I control the time during which the ignition circuit is interrupted by means of electromagnetic relay which operates to maintain the ignition circuit open for a measured time after the solenoid circuit is interrupted. This measured time is controlled by the relay and is independent of the movement of retraction of the sun gear locking pawl. The time delay is greater than the time required under all normal conditions for the sun gear locking pawl to be withdrawn. In case the pawl is not retracted for any reason, such as failure of the return spring, the sticking of the pawl due to heavy, cold lubricant or due to excessive negative pressure as when going down a long grade, the relay completes the ignition circuit in any event.

According to the disclosure of my application #290,356 I combine, with the time measuring relay, a switch actuated in response to the return of the pawl to fully retracted position for reestablishing the ignition circuit. In this way I am able to reduce the time during which the ignition is nonoperative to the minimum requirements while, at the same time, providing for the ultimate reestablishment of the ignition circuit in case of failure to retract the sun gear locking pawl.

It is an object of the invention of the present application to prevent interference by other elements of the overdrive control system with the function of the measured time relay to maintain the ignition circuit in non-operating condition for a predetermined time. In accomplishing this object I provide for the opening of the circuit of the magnet coil of the measured time relay ahead of disconnecting the solenoid from the battery so that, any inductive kick derived from the solenoid, when disconnected from the battery, cannot operate in a way such as to hasten the decay of flux in the measured time relay and thereby cause it to operate for the purpose of rendering the ignition circuit operative before the lapse of a predetermined time. In the present application I disclose this feature in a system in which the ignition circuit is grounded for the purpose of rendering the ignition inoperative.

Further objects and advantages of the present invention will be apparent from the following description, reference being had to the accompanying drawings wherein preferred embodiments of the present invention are clearly shown.

Figures 1, 2:
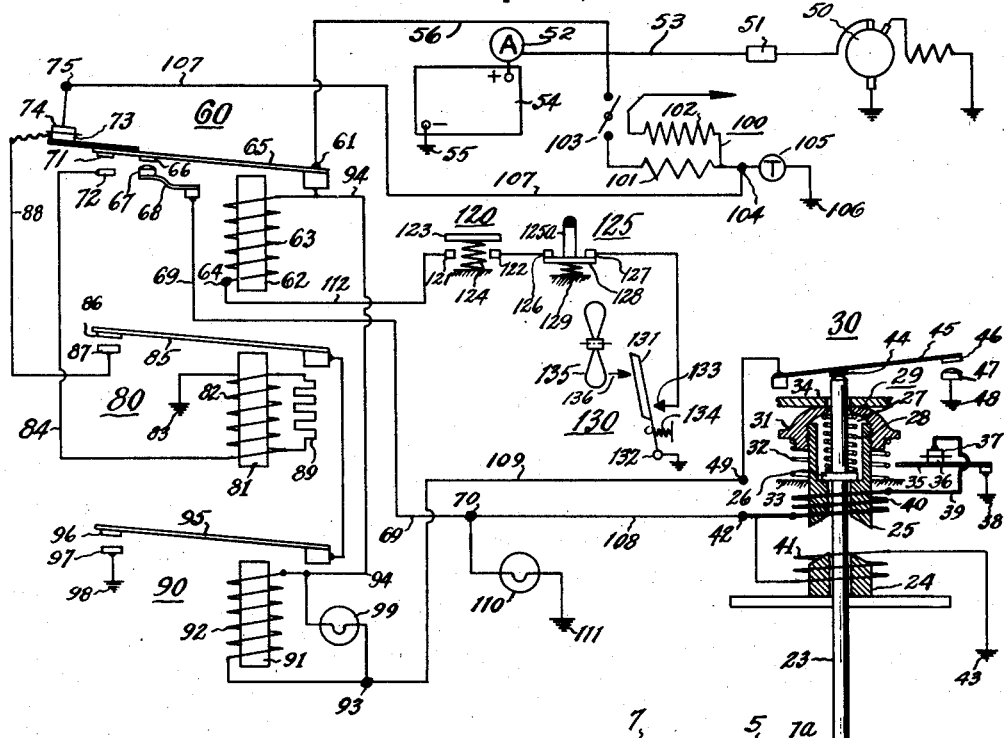
Fig. 1 shows a diagram of an overdrive to which the control of my present invention is applied, said control being illustrated by a wiring diagram forming a part of Fig. 1.
Fig. 2 is a diagram showing the sun gear locking pawl and pawl blocking member which has been moved to position to permit movement of the pawl into engagement with the sun gear locking ring.

Referring to Fig. 1, numeral 1 indicates the driving shaft of the overdrive mechanism. The shaft 1 receives its power from the change speed gear mechanism housed in a box which would be located between the overdrive mechanism and the engine clutch. The shaft 1 is provided with external splines 2 which mesh with internal splines 3a of the ring 3 and with internal splines 9a of the driving member of an overrunning clutch 9. The external splines 2 mesh also with internal splines 8a of a coupling member 8 to which the propeller shaft 8b may be attached. The splines 2 connect together the members 3 and 9 as shown in Fig. 1, when it is desired to use the overdrive mechanism. When it is not intended that the overdrive mechanism shall be used for any considerable period of time, the overdrive may be entirely disconnected by moving the shaft 1 endwise toward the left so that its external splines 2 will engage the internal splines 8a of the member 8, thus connecting together the members 8 and 9 and leaving the members 3 free. The shaft 1 is supported for axial movement at both ends. The support for the right hand end of the shaft 1 is not shown. At the left end of the shaft 1 it is provided with a reduced portion 1c having a sliding fit within an axially aligned recess 8c provided in the member 8.

The ring 3 carries a plurality of rods 4 each rotatively supporting a planet gear 5 which meshes with a sun gear 6 and with an internal ring gear 7a integral with ring 7, which cooperates with the clutch rollers 10, which in turn cooperate with a driving clutch cam 9 to receive transmission of torque from the driving member 1 at such time as the driving member 9 tends to rotate ahead of the member 7. However, when a ring 11 attached to the sun gear 6 is engaged by a sun gear locking pawl 22 which is received by one of a series of notches 12 in ring 11, the internal ring gear 7a and its ring 7 are driven at a speed exceeding the speed of the clutch driving member 9. Under these conditions the ring 7 will overrun the clutch driving member 9. The pawl 22 is normally maintained out of engagement with the ring 11 by a pawl rod 23 which is controlled in a manner to be described. Movement of the pawl 22 into engagement with the ring 11 is obstructed, except under certain conditions, by a blocker plate 13 which is frictionally dragged by ring 11. The block plate 13 is provided stop lugs 14 and 15 which project beyond stop surfaces 16 and 17 which may be engaged under certain conditions by the pawl 22. The surfaces 16 and 17 are interrupted by a notch 18 of sufficient width to permit movement of the pawl 22 between the surfaces 16 and 17 when the notch 18 is brought into alignment with the pawl 22, as shown in Fig. 2. The pawl 22 is guided between bosses 19 and 20 of the frame 21 of the overdrive mechanism. Bosses 19 and 20 project into the plane of the blocker plate 13 so as to be engaged by lugs 14 and 15, respectively. When the ring 11 rotates clockwise, the blocker plate 13 will be frictionally dragged clockwise until its lug 14 strikes the boss 19, and further movement of the blocker plate 13 in the clockwise direction will cease. When the ring 11 rotates counterclockwise, the blocker plate 13 will be frictionally dragged counterclockwise until its lug 15 engages the boss 20 whereupon counterclockwise movement of the plate 13 will cease. An explanation of the clockwise and counterclockwise movements of the ring 11 will be given in connection with the mode of operation of the control device which controls the overdrive gearing.

The sun gear locking pawl 22 is attached to a pawl rod 23 forming part of a solenoid unit 30. Rod 23 extends thru a solenoid stationary core 24 and through a solenoid armature 25. Rod 23 has a shoulder portion 26 located within a recess 27 provided by the armature 25. Recess 27 houses a coil spring 28 located in a state of compression between the shoulder 26 and a nut 29 threadedly attached to the armature 25. Nut 29 has a flange 31 engaged by coil spring 32 located in a state of compression between flange 31 and a stationary member 33. Spring 32 normally urges the nut 29 against a stationary plate 34. Flange 31 is engageable with a resilient contact arm 35 carrying a contact 36 normally engaged with a contact 37. Arm 35 is grounded at 38. Contact 37 is connected by a wire 39 with the main attracting coil 40 of the solenoid connected with a terminal 42. Coil 40 is a series coil comprising a relatively small number of turns of relatively coarse wire. Terminal 42 is connected with solenoid holding coil 41 which comprises a relatively large number of turns of fine wire. Holding coil 41 is grounded at 43. The rod 23 extends thru the nut 31 and the stationary stop plate 34 to engage a non-conducting block 44 attached to a resilient contact arm 45 carrying a contact 46 normally out of engagement with contact 47 which is grounded at 48. Arm 45 is connected with a terminal 49.

The solenoid unit is described in further detail in my copending application S. N. 290,356, filed August 16, 1939.

A generator 50 is connected thru a reverse circuit relay 51, an ammeter 52 and a wire 53 with a storage battery 54 grounded at 55. A wire 56 connects wire 53 with terminal 61 of a relay 60. Relay 60 comprises a core 62 surrounded by a magnet winding 63 connected with terminal 61 and with a terminal 64. Terminal 61 is connected with an armature 65 normally resiliently urged away from the core 62. Armature 65 carries a contact 66 for engaging a contact 67 mounted on a resilient arm 68 connected by a wire 69 with a terminal 70. Armature 65 carries a contact 71 engageable with a contact 72. Armature 65 insulatingly supports a contact 73 normally engaging a contact 74 connected with a terminal 75.

Numeral 80 designates a measured time relay having a core 81 surrounded by a magnet coil 82 grounded at 83 and connected by wire 84 with contact 72 of relay 60. Core 81 cooperates with an armature 85 normally biased away from the core and carrying a contact 86 engageable with a contact 87 connected by a wire 88 with contact 73 of relay 60. A noninductive resistance 89 is connected in shunt with magnet coil 82 for the purpose to be described later.

Numeral 90 designates a quick operating relay which comprises a core 91 surrounded by magnet coil 92 connected at one end with a terminal 93 and connected at the other end by wire 94 with terminal 61 of relay 60. Core 91 cooperates with armature 95 normally biased away from the core and carrying a contact 96 engageable with a contact 97 grounded at 98. An indicator lamp 99 is connected between the wire 94 and the terminal 93.

Numeral 100 designates an ignition coil having a primary 101 and a secondary 102. Primary 101 is connected with wire 53 thru an ignition switch 103. Primary 101 is connected with a terminal 104 and with an ignition timer 105 grounded at 106. Terminal 104 is connected by a wire 107 to the terminal 75 of relay 60.

Terminal 70 is connected by wire 108 with terminal 42 of solenoid unit 30. Wire 109 connects terminal 93 with terminal 49 of solenoid unit 30. An indicator lamp 110 grounded at 111 is connected with terminal 70.

Terminal 64 of relay 60 is connected by wire 112 with a gear switch 120 having stationary contacts 121 and 122 adapted to be bridged by movable contact 123 held out of engagement with stationary contacts by a spring 124. The gear switch 120 is closed by mechanism for controlling the connection of certain trains of gears between the engine shaft and the propeller shaft of the automobile. For example, switch 120 may be closed by mechanism which is actuated when the manually operated gear shaft lever is in intermediate position or in high speed position. Switch 120 might be closed by the mechanism for shifting the shaft 1 into the position shown in Fig. 1. When the shaft 1 is moved toward the left to disconnect gear 1 from element 3 and to connect gear 2 with element 8a the switch 120 would be opened.

Switch 120 is connected with kick switch 125 comprising stationary contacts 126 and 127 normally engaged by contact 128 held normally in contact closing position by a spring 129. The switch 125 is opened by a suitable pedal cooperating with switch actuating rod 125a. This pedal may be the engine throttle or accelerator pedal which causes the switch 125 to open by movement of accelerator pedal beyond wide open throttle position.

Switch 125 is connected with ground thru a switch responsive to vehicle speed such as an air switch 130 having a grounded vane 131 pivoted at 132 maintained normally out of engagement with contact 133 by a spring 134. The vane 131 is moved into engagement with contact 133 by the action of an air current provided by the engine cooling fan 135 which causes a current of air to impinge upon the vane 131 as indicated by the arrow 136.

The operation of the overdrive system illustrated by Fig. 1 is as follows: While the engine is running the ignition switch 103 will be closed. When the vehicle transmission is set for drive thru certain gear trains, the switch 120 will be closed. When the vehicle speed attains a certain value such as 25 M. P. H. for example, the air switch 130 will be closed. As stated before, switch 125 is normally closed. All three switches 120, 125 and 130 being closed, the winding 63 of relay 60 will receive current from the battery 54 thereby causing armature 65 to be attracted and contacts 66 and 71 to engage contacts 67 and 72, respectively. Contact 66 engages contact 67 before contact 71 engages contact 72. Therefore, when armature 65 moves away from core 62, contact 71 will be separated from contact 72 before contact 66 is disengaged from contact 67 for a purpose to be described later. Movement of contact 65 toward core 62 causes contact 73 to be separated from contact 74 thereby interrupting any ground connection which could be made with terminal 104 between timer 105 and coil 100.

When contact 66 engages contact 67 the solenoid coils 40 and 41 will be connected to the battery thru the following circuit: Battery 54, wire 56, terminal 61, armature 65, contact 66, contact 67, arm 68, wire 69, terminal 70, wire 108, terminal 42, winding 40, wire 39, contact 37, contact 36, arm 35, ground 38 and battery ground 55. From terminal 42 there is a circuit thru winding 41 to ground 43. Both windings 40 and 41 cooperate to attract solenoid armature 25 toward core 24. As armature 25 moves downwardly, it carries with it the nut 29 which bears the upper end of the spring 28 downwardly thereby tending to move the rod 23 downwardly.

When the solenoid is not excited, the spring 32, acting through the pawl rod 23, keeps pawl 22 out of engagement with the blocker plate 13. When the engine drives the transmission, the ring 11 moves counterclockwise as viewed in Fig. 2 and the plate 13 is frictionally dragged counterclockwise so that its lug 15 engages boss 20 thereby causing surface 17 to be in the path of movement of the pawl 22. When the engine speed is increased to the speed where the governor switch 130 closes, the hand controlled change speed gearing being in intermediate or high gear, the solenoid will be energized in the manner described. The pawl 22 is then urged downwardly by spring 28 and presses against surface 17. Engagement of the pawl 22 with the notched locking ring 11 is prevented until the speed of ring 11 is reduced to zero and the rotation of ring 11 reverses.

The reversal of ring 11 is effected by a reduction of engine speed (measured in miles per hour of vehicle speed) below vehicle speed by a predetermined amount dependent upon the gear ratio of overdrive to normal drive. For example, if the overdrive increases the speed ratio between vehicle drive wheels and the engine by 30%, the engine speed must be reduced below vehicle speed by the amount of 30% of vehicle speed. Assuming the vehicle is being propelled through normal drive at 40 M. P. H. and it is desired to go into overdrive, the driver releases the accelerator pedal to permit engine speed to decrease. The vehicle "free wheels" (through overrunning clutch 9—10) at a speed starting at 40 M. P. H. and diminishing slightly due to resistance of wind and friction to about 35 M. P. H. Meanwhile the engine speed has diminished to 24 M. P. H., which speed is slightly more than 30% less than 35 M. P. H., the concurrent vehicle speed. As the engine speed decreases to 24 M. P. H., the speed of ring 11 is reduced to zero and then the ring 11 starts to reverse in direction of rotation or to move clockwise as viewed in Fig. 2. As ring 11 begins to move slowly clockwise, it drags frictionally the blocker plate 13 clockwise thereby causing its lug 15 to move away from the boss 20 and its notch 18 to become aligned with pawl 22 thereby permitting spring 28 to press pawl 22 against a tooth of ring 11. As ring 11 continues to rotate, it brings a notch 12 into alignment with pawl 22 thereby permitting spring 28 to press pawl 22 into locking engagement with the ring 11 thereby locking sun gear 6. While the sun gear 6 is locked, transmission of power from the shaft 1 to the shaft 8b takes place through the elements 2, 3a, 3, 4, 5, 7a, 7 and 8. The sun gear 6 being stationary, the ring gear 7a rotates faster than shaft 1. Since parts 9 and 7 are connected through a one-way clutch represented by the numeral 10, the ring 7 overruns the shaft 1 while the overdrive is effective.

During movement of the solenoid armature 25 the core 24 preloads the spring 28 so that it may push the pawl 22 into a notch 12 of the sun gear locking ring 11 when the blocker 13 is retracted, and the flange 31 of nut 29 engages the resilient contact arm 35 thereby separating contact 36 from contact 37 and breaking the circuit thru the main attracting coil 40 of the solenoid. The armature 25, being then in relatively close proximity with the core 24, is held in the attracted position by the holding coil 41.

When contacts 71 and 72 of relay 60 are closed, winding 82 of relay 80 is connected thru the following: battery 54, wire 56, terminal 61, armature 65, contact 71, contact 72, wire 84, coil 82, ground 83 and battery ground 55. Armature 85 is attracted toward core 81 to cause the contact 86 to engage contact 87. Armature 85 seats on core 81 for a purpose to be described.

During downward movement of pawl rod 23, the downwardly biased resilient arm 45 causes contact 46 to move into engagement with contact 47 thereby connecting coil 92 of relay 90 with battery 54 thru the following: battery 54, wire 56, terminal 61, wire 94, coil 92, terminal 93, wire 109, terminal 49, resilient arm 45, contact 46, contact 47, ground 48 and battery ground 55. Armature 95 is attracted to the core 91 to carry its contact 96 into engagement with contact 97 grounded at 98.

The circuit for grounding the ignition apparatus and thereby rendering it inoperative comprises wire 107, leading to terminal 104, terminal 75, contacts 74 and 73 of relay 60, wire 88, contacts 87 and 86 of relay 80, armature 85, armature 95 of relay 90 and contacts 96 and 97. While the pawl 22 engages the sun gear locking ring 11 to render the overdrive operative, the pairs of contacts 96—97 and 86—87 are closed while the pair of contacts 73—74 are open. Therefore the ignition apparatus remains operative.

When the driver desires to render the overdrive inoperative, he presses the kick-switch rod 125a to interrupt the flow of current thru the winding 63 of the relay 60, whereupon the armature 65 returns to normal position separating contacts 66—67 and 71—72 and reengaging contacts 73—74. This interrupts the flow of current thru the magnet winding 82 of relay 80 and thru the solenoid holding coil 41 thereby permitting relay 80 and solenoid armature 25 to return to normal condition. The ignition is momentarily rendered inoperative because relay 80 delays separation of contacts 86—87 for a brief interval, thus rendering the engine inoperative and thereby producing a condition favorable to the retraction of pawl 22 by spring 32. When the holding coil 41 is deenergized, spring 32, by operating thru the nut 27, and the nut 27, by operation on the shoulder 26 causes the pawl rod 23 and the pawl 22 to be restored to normal position. During upward movement of rod 27, the resilient contact arm 35 is relieved from engagement with the flange 31 of nut 29 thereby permitting the contact 36 to reengage the contact 37.

A predetermined time after the separation of the contacts of relay 60, the contact 86 of relay 80 returns to normal open position and the ignition is restored. This predetermined time is measured or determined by the relay 80. The lag or time delay between the opening of contacts 66 and 67 of relay 60 and the opening of contacts 86 and 87 of relay 80 is effected by causing the armature 85 to seat or seal against the core 81 of relay 80 when its contacts are closed, thereby making it necessary for the magnetic flux in the core 81 to diminish substantially to zero before the armature 85 is released. The decay of flux in the core 81 is retarded by the non-inductive resistance 89. During this measured time interval between the opening of contacts 66—67 of relay 60 and the opening of contacts 86—87 of relay 80, the ignition terminal 104 is grounded due to the fact that all of the pairs of contacts 73—74, 86—87 and 96—97 are then closed. The grounding of the ignition coil 100 eliminates the igniting of several charges of fuel thereby causing the engine to cease to drive the vehicle and thereby relieving the torque reaction between the sun gear locking ring 11 and the pawl 22 in order to facilitate retraction of the pawl by the spring 32.

The pawl 22 having been relieved of a pressure placing a frictional drag on the pawl, the pawl 22 and its rod 23 move upwardly due to the action of the spring 32. By the time that the pawl 22 has been fully retracted from the sun gear locking ring 11, the rod 23 will have engaged the insulating button 44 of the contact arm 45 thereby causing contact 46 to move out of engagement with contact 47, thereby interrupting the flow of current thru the coil 91 of the relay 90. Relay 90, being a quick acting relay since there is a relatively wide gap provided between core 91 and armature 95, will respond quickly to the interruption of the flow of current thru its coil 92; and the contacts 96 and 97 will be separated an instant after the separation of contacts 46 and 47. Therefore, as soon as the locking pawl 22 has been fully retracted from the sun gear locking ring 11, the ignition grounding circuit will be broken. Under normal conditions the contacts of relay 90 will open sooner than the contacts of relay 80. However, the opening of the contacts of relay 90 is contingent upon the retraction of the sun gear locking pawl 22 by the spring 32. In case the pawl 22 is not retracted for any reason, such as failure of the return spring 32, the relay 80 finally operates to interrupt the ignition grounding circuit, thereby causing the ignition to be reestablished regardless of whether the overdrive has been rendered inoperative. Therefore the circuit operates whenever the driver desires to come out of overdrive in a manner such as to disable the ignition in order to facilitate coming out of overdrive under normal conditions. However, in case of failure of the vehicle transmission to come out of overdrive, the ignition is reestablished after a time which should be sufficient for the vehicle transmission to come out of overdrive under normal circumstances. In other words, under normal conditions, the relay 90 opens ahead of the relay 80 to interrupt the ignition grounding circuit. But, should the relay 90 fail to open to reestablish the ignition circuit, the relay 80 will eventually open after a measured time interval in order that the engine may be provided with ignition regardless of failure of the vehicle transmission to come out of overdrive.

It has been stated earlier in this specification that contacts 71—72 open ahead of contacts 66—67. This arrangement is made in order that the inductive kick derived from the holding coil 41 at the instant of the separation of contacts 66—67 will not be transmitted to the coil 82 of relay 80. If contacts 71—72 opened after contacts 66—67, an inductive kick derived from the holding coil 41 at the instant of separation of contacts 66—67 would be delivered to the coil 82 of relay 80 in a direction such as to accelerate the decay provided by this relay. In order to obtain the prescribed time delay feature of relay 80 without materially adding to its cost, interference with the time delay feature of relay 80 by the inductive kick from the holding coil 41 is eliminated by opening contacts 71—72 ahead of contacts 66—67 so that relay winding 82 is out of the circuit before a voltage can be induced in the winding 41.

The purpose of the signal lamps 99 and 110 will now be explained. At the instant relay 60 closes to supply current to the solenoid 30, lamp 110, which may be a red lamp, will burn to indicate that current has been supplied to the solenoid to initiate its operation. When the transmission is in overdrive, the lamp 99 will burn due to the closing of contacts 46—47 of solenoid unit 30. Lamp 99 may be green to distinguish from the red lamp 110.

Figure 3:
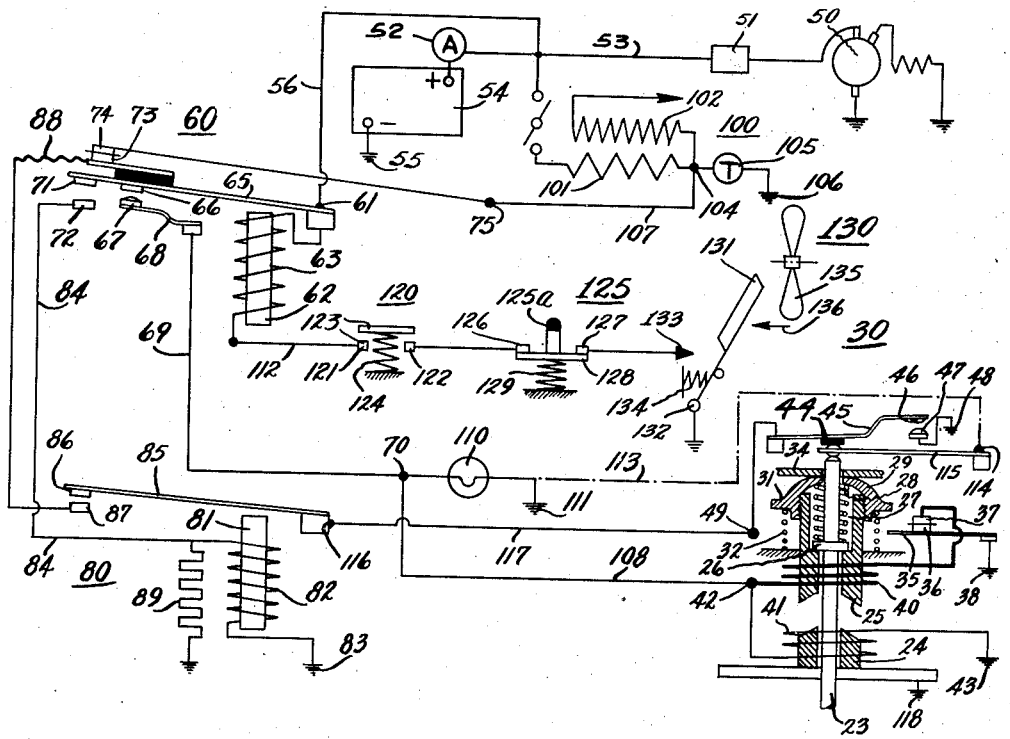
Fig. 3 is a wiring diagram of another form of my invention.

The modified form of control system shown in Fig. 3 is similar to Fig. 1 in function but differs therefrom by the omission of the third relay 90 and connection of the contacts 86 of relay 80 directly with the contacts 46 of solenoid 30 through a wire 117 connecting terminal 116 of relay 80 with terminal 49 of solenoid 30. In Fig. 3, rod 23 actuates contact arm button 44 through a contact blade 115. Contacts 46—47, 86—87 and 73—74 are in series in the grounding circuit of the ignition coil 100 which leads from terminal 104 to ground 48 of solenoid 30.

In Fig. 3, if lamp 110 is connected to ground 111 and the optional wire 113 leading to solenoid terminal 114 is omitted, the lamp 110 will burn while the overdrive remains operative. If ground 111 is omitted and wire 113 is included, lamp 110 burns to indicate that the control is operating to render the solenoid operative to establish the overdrive. The ground circuit of the lamp includes wire 113, terminal 114, contact blade 115, rod 23 and ground 118 provided by the solenoid 30. When the overdrive has been established, rod 23 will have become separated from blade 115 to interrupt the lamp grounding circuit. The lamp 110 goes out to indicate that the transmission is in overdrive.

From the foregoing description of the construction and mode of operation of the disclosed embodiments of the present invention, it is apparent that I have provided the combination with a sun gear pawl normally held out of locking position by a spring, of a solenoid for actuating the pawl into locking position, said solenoid being controlled automatically in response to vehicle speed and in response to the status of the vehicle transmission gears, and means under the control of the operator for rendering the solenoid inoperative and also for grounding the ignition system so that conditions are produced which are favorable to the retraction of the pawl by the spring, and means for restoring the ignition to operative condition independent of any control by the driver and independent of any movement of the pawl to non-locking position. This last named means functions automatically to restore the ignition to operative condition a measured time interval after operation of the means which renders the solenoid inoperative. Since there is a time interval of appreciable duration between the rendering of the ignition inoperative and the restoration of the ignition to operative condition, I have brought about two separate instances where conditions are favorable to the retraction of the pawl from sun gear locking position by the pawl returning spring.

Let us first consider the instance where the ignition is rendered inoperative. It will be understood there is a certain amount of lost motion or side-play between the pawl 22 and the sides of a notch 12 of the locking ring 11. While the engine ignition is operative and the engine drives the vehicle, the torque transmitted by the engine to the vehicle drive wheels is what I term as positive torque. When the engine ignition is rendered inoperative, the vehicle tends to drive the engine and the transmission of torque is reversed. I designate this reversed torque as negative torque. When positive torque is present the pawl 22 will press against one side of a notch 12 and, when negative torque is present, the pawl 22 will press against the other side of the notch 12. It is obvious that, if the ignition is rendered inoperative causing the engine to cease to fire, the torque will change from positive to negative and the pawl 22 will move from a position where it presses against one side of the notch 12 to a position where it presses against the other side of the notch. During the period of time of relative sidewise movement between the notch 12 and the pawl 22 in which the pawl 22 relatively moves from one side of the notch 12 to the other, there is a condition where there is no binding force between the ring 11 and pawl 22 to resist withdrawal of the pawl 22 by the pawl return spring 32. This change from positive torque to negative torque produces a condition which is favorable to the retraction of the pawl 22 from the ring 11. Obviously the duration of this condition is relatively short, since it continues only long enough for the pawl to leave one side of the notch, traverse the lost motion space between the sides of the notch and then engage the opposite sides of the notch. Under some unusual circumstances, this period of short duration might not be sufficient for the pawl 22 to be completely withdrawn from the sun gear locking ring 11. However, another instance of favorable conditions for retraction of the pawl 22 by the spring 32 is afforded.

At the end of the measured time interval provided by relay 80 during which the ignition may be inoperative, there is another condition of no binding between the pawl 22 and ring 11 at the instant when the ignition apparatus is rendered operative, because there is another reversal of torque from negative torque to positive torque. Therefore, the present invention provides two instances which are favorable to the retraction of the pawl 22 of the sun gear locking ring 11. Therefore there are two opportunities for the pawl 22 to be retracted.

While the embodiments of the present invention as herein disclosed, constitute preferred forms, it is to be understood that other forms might be adopted, all coming within the scope of the claims which follow.

What is claimed is as follows:

1. In an overdrive control for an automotive vehicle propelled by an internal combustion engine having electrically operated ignition, the combination of a sun-gear-locking pawl, a spring normally retaining the pawl in non-locking position, a current source, a solenoid for moving the pawl into locking position, a circuit for grounding the ignition, a time relay for maintaining the grounding circuit closed for a predetermined time after the solenoid is deenergized to eliminate engine operation in order to facilitate return of the pawl to non-locking position, and a circuit breaker operable in one direction to interrupt the grounding circuit and to connect the current source with the solenoid and with the time relay magnet coil, and operable in the reverse direction to remake the grounding circuit and to disconnect the time relay magnet coil from the current source before disconnecting the current source from the solenoid in order to prevent an effect upon the time relay by a voltage induced in the solenoid.

2. In an overdrive control for an automotive vehicle propelled by an internal combustion engine having electrically operated ignition, the combination of a sun-gear-locking pawl, a spring normally retaining the pawl in non-locking position, a current source, a solenoid for moving the pawl into locking position, a circuit for grounding the ignition and including a pair of normally closed contacts and a pair of normally open contacts, a time relay for maintaining the normally open contacts closed a predetermined time after the solenoid is deenergized to eliminate engine operation in order to facilitate the return of the pawl to non-locking position, a solenoid relay including an armature for separating the normally closed ignition grounding contacts while the solenoid is energized and having also two pairs of normally open contacts closed by attraction of the armature for connecting the current source with the solenoid and with the magnet coil of the time relay, said pairs of contacts being mounted and arranged so that, when the armature of the solenoid relay is released, the pair of contacts connecting the current source and time relay coil will open ahead of the pair of contacts connecting the current source and solenoid in order to prevent an effect upon the time relay by a voltage induced in the solenoid and means for connecting the current source with the magnet coil of the solenoid relay.

3. In an overdrive control for an automotive vehicle propelled by an internal combustion engine having electrically operated ignition, the combination of a sun-gear-locking pawl, a spring normally retaining the pawl in non-locking position, a current source, a solenoid for moving the pawl into locking position, a circuit for grounding the ignition, a time relay for maintaining the grounding circuit closed for a predetermined time after the solenoid is de-energized to eliminate engine operation in order to facilitate return of the pawl to non-locking position, a circuit breaker operable in one direction to interrupt the grounding circuit and to connect the current source with the solenoid and with the time relay magnet coil, and operable in the reverse direction to remake the grounding circuit and to disconnect the time relay magnet coil from the current source before disconnecting the current source from the solenoid in order to prevent an effect upon the time relay by a voltage induced in the solenoid and a switch responsive to retraction of the pawl from sun-gear-locking position for interrupting the ignition ground circuit.

4. In an overdrive control for an automotive vehicle propelled by an internal combustion engine having electrically operated ignition, the combination of a sun-gear-locking pawl, a spring normally retaining the pawl in non-locking position, a current source, a solenoid for moving the pawl into locking position, a circuit for grounding the ignition and including a pair of normally closed contacts and a pair of normally open contacts, a time relay for maintaining the normally open contacts closed a predetermined time after the solenoid is de-energized to eliminate engine operation in order to facilitate the return of the pawl to non-locking position, a solenoid relay including an armature for separating the normally closed ignition grounding contacts while the solenoid is energized and having also two pairs of normally open contacts closed by attraction of the armature for connecting the current source with the solenoid and with the magnet coil of the time relay, said pairs of contacts being mounted and arranged so that, when the armature of the solenoid relay is released, the pair of contacts connecting the current source and time relay coil will open ahead of the pair of contacts connecting the current source and solenoid in order to prevent an effect upon the time relay by a voltage induced in the solenoid, means for connecting the current source with the magnet coil of the solenoid relay, and a switch responsive to retraction of the pawl from sun-gear-locking position for interrupting the ignition ground circuit.

EDWARD M. CLAYTOR.